TIMED OUTPUT PULSE PROVIDING DEVICE RESPONSIVE TO DIGITAL INPUT SIGNALS

Filed Nov. 4, 1960

WITNESSES

Leon J. Laga

Lawrence I. Lerner

INVENTORS

James Dobbie and

Emil T. Schonholzer

BY

Paul E. Friedemann

ATTORNEY 3,155,959

TIMED OUTPUT PULSE PROVIDING DEVICE RESPONSIVE TO DIGITAL INPUT SIGNALS

James Dobbie and Emil T. Schonholzer, Williamsville, N.Y., assignors to Westinghouse Electric Corporation, East Pittsburgh, Pa., a corporation of Pennsylvania Filed Nov. 4, 1960, Ser. No. 67,222
5 Claims. (Cl. 340—347)

This invention relates in general to an improved device for translating information. More particularly it relates to a simplified electronic device for translating pulsed digital information into a timed pulse output.

One problem with which this invention is concerned is the selective reading out of a digital input, such as binary coded function, into a pulse the duration of which is a function of the digital input. This is necessary in applications where there is utilized an error signal in digital form that is periodically read out and, where it is preferred to have the error signal in the form of a timed pulse.

This type of application is suitable for gauge control apparatus for steel mill operations.

It is the general object of the invention to accomplish the foregoing purposes by providing a more simple and improved translating device for converting digital information into a timed pulse output.

Another object is to provide an improved code translating device utilizing static switching elements.

Another object is to provide an improved code translating device capable of being adapted to any type of digital input.

Another object is to provide a coded translating device which may be better utilized to sample a digital input to obtain a selected timed pulse output.

The aforesaid objects of the invention and other objects that will become apparent as the description proceeds are achieved by providing a voltage reference signal capable of charging a plurality of storage capacitors to a positive value, when each capacitor has an individual static switching means provided which will respond to a given digital input. A second static switching means is utilized in combination with a second voltage reference signal of opposite polarity so that, when a read out is desired, the second static switching means will remove the first voltage reference signal and apply the second voltage reference signal through a resistance to the charged capacitors. Only those capacitors whose static switching means are operative will discharge and charge to the negative value of the second voltage reference. The time period that it takes for the voltage across the capacitors whose static switches have operated to reach zero, will be a function of the number of static switching means which are operative. This capacitor voltage switches an output transistor so that an indication is readily available in the form of a timed pulse of the delay in the dropping of the capacitor voltage to zero.

For a better understanding of the present invention reference should be had to the following description when read in conjunction with the accompanying drawings wherein.

Figure 1:
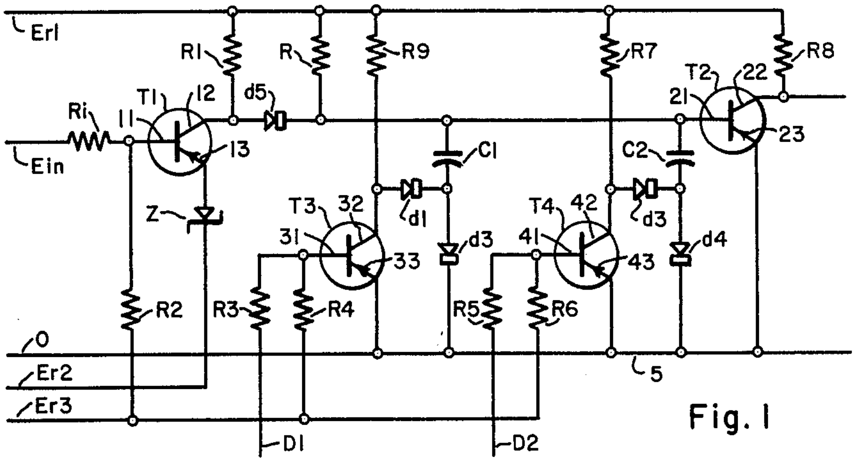
FIGURE 1 is a circuit diagram embodying the present invention.

In FIG. 1 transistor T1 has a base 11, a collector 12 and an emitter 13, and acts as a voltage reference signal switching means. Input signals $E_{in}$ are supplied to transistor T1 through resistance $R_1$ to the base 11. A base reference signal is supplied from a voltage reference $E_{r3}$ through a resistor R2. The emitter 13 of the transistor T1 is connected through a Zener diode Z to a second voltage reference signal source $E_{r2}$. In the embodiment shown $E_{r2}$ will have a positive value. The collector 12 of transistor T1 is connected through a resistor R1 to a collector voltage supply $E_{r1}$ which will have a negative value in this illustration.

A transistor T2 having a base 21, a collector 22 and an emitter 23 acts as an output sensing means and has its base 21 connected through a diode D5 to the collector 12 of transistor T1. The emitter 23 of transistor T2 is connected to a ground wire 5. The collector 22 of transistor T2 is connected through a resistor R8 to the collector voltage reference supply $E_{r1}$.

Capacitors C1 and C2 have first terminals connected to the base 21 of transistor T2. The second terminal of C1 is connected through a diode D2 to the ground wire 5. The second terminal of capacitor C2 is connected through a diode D4 to ground wire 5.

A third transistor T3 having a base 31, a collector 32 and an emitter 33 acts as a static switching means and has its collector 32 connected through a diode D1 to the second terminal of capacitor C1. A resistor R9 connects the collector 32 of transistor T3 to the collector reference supply $E_{r1}$. The emitter 33 of transistor T3 is connected to the ground wire 5. The base 31 of transistor T3 is connected through a resistor R4 to the base reference supply means $E_{r3}$. Digital steady-state signals supplied from a source D1 are fed through resistor R3 to the base 31 of transistor T3.

Transistor T4 having a base 41, a collector 42 and an emitter 43 acts as a static switching means and has its collector 42 connected through a diode D3 to the second terminal of the capacitor C2. The collector 42 is also connected through a resistor R7 to the collector reference supply $E_{r1}$. The emitter 43 of transistor T4 is connected to the ground wire 5. The base 41 of transistor T4 is connected through resistor R6 to the base supply means $E_{r3}$. A second source of digital steady-state signal information D2 controls the base of transistor T4 through resistor R5.

In normal operation the number of capacitor C1 and C2 with their accompanying diodes D1 through D4 and transistors T3 and T4 will be determined by the number of digital inputs necessary or desired. Thus, five capacitors would be needed to read out a number such as 25 in a binary coded system in which the number 25 would appear as 10011. The operation of the preferred embodiment of the invention can best be described with reference to FIGS. 2, 3, 4 and 5 in which FIG. 2 is a graph of voltage at the base 11 of the transistor T1.

Figures 2, 3, 4, 5:
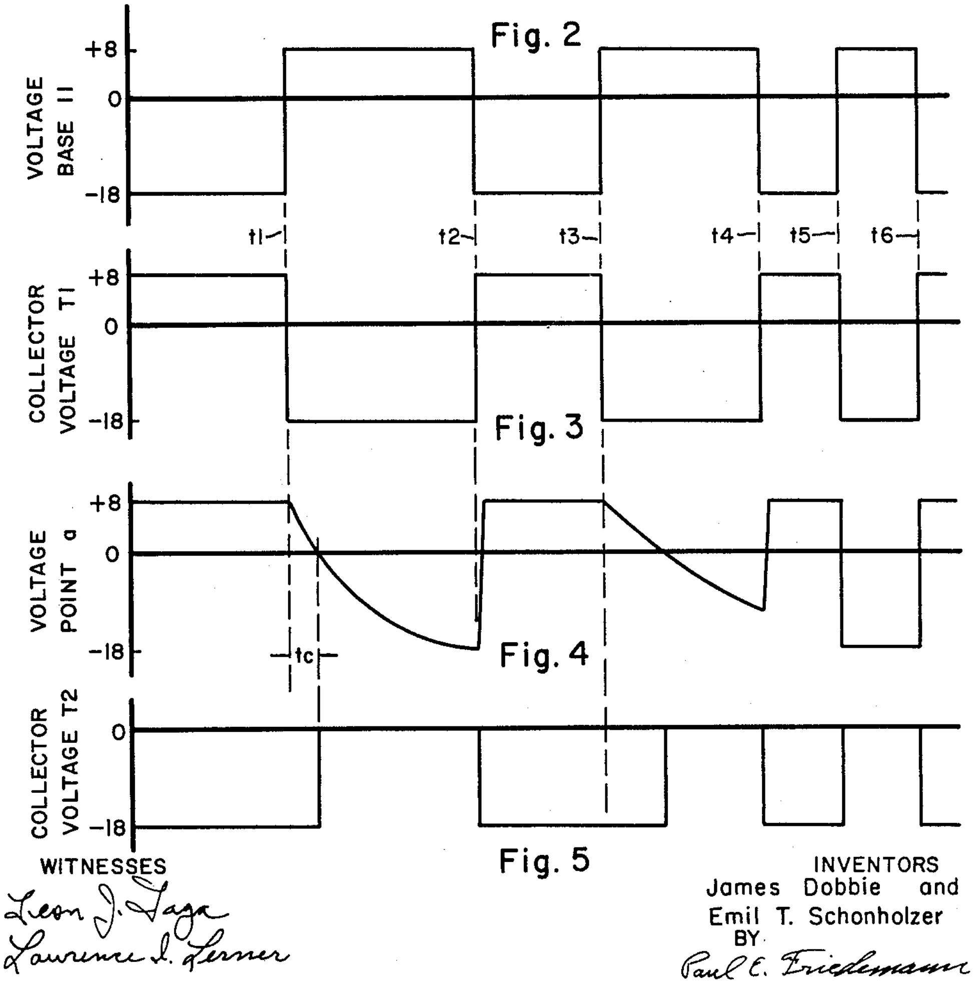
FIGS. 2, 3, 4 and 5 are voltage-time graphs of voltages at various points in the circuit of FIG. 1 and illustrative of our invention.

FIG. 3 is a graph of the voltage at the collector 12 of transistor T1.

FIG. 4 is a graph of the voltage at the first terminal of the capacitors C1 and C2, and FIG. 5 is a graph of the voltage at the collector 22 of transistor T2.

With a negative input on the base 11 of transistor T1, the transistor is saturated and there is effectively little impedance drop across the path including the collector 12 and the emitter 13. Therefore, as there is a positive voltage reference signal from the source $E_{r2}$ across the Zener diode Z, the voltage across the Zener diode will appear at the collector 12. Since this voltage is positive it will make the base 21 of transistor T2 positive and cut it off. Therefore, the output of transistor T2 will be the negative collector reference voltage $E_{r1}$.

A circuit will also be formed including the Zener diode Z through the emitter 13 and collector 12 of transistor T1, diode D5, capacitor C1, diode 3, ground wire 5, and voltage reference signal means $E_{r2}$. This circuit will act to charge capacitor C1 very quickly to the value of the voltage reference signal $E_{r2}$. The capacitor C2 and diode D4 form a parallel circuit to the capacitor C1 and diode D2 so that the capacitor C2 is also charged to the same value. Since there is little resistance in the circuit described above, the charge rate is extremely fast.

If, at time *t*1, shown in FIG. 2, the input to the base 11 of transistor T1 is removed, the voltage at the base will go positive and the transistor T1 will be cut off. At this point the collector 12 of transistor T1 would almost immediately change to the value of the negative collector reference voltage $E_{r1}$. The voltage at the first terminal of the capacitor C1 would also change to this value if the capacitors were not provided in the circuit. But, the capacitors will slow down the latter change in voltage, due to well known principles of transients, and the time necessary to change the voltage will be dependent upon the time constant of the resulting icrcuit. The time constant will be a function of the resistance R times the capacitance placed in the circuit.

The capacitor placed in the circuit will be dependent upon the digital inputs D1 and D2. If there is an input at D1 it will switch transistor T3 into saturation and thus provide an effective discharge path for the capacitor C1. The circuit would include capacitor C1, diode D1, collector 32, and emitter 33 of transistor T3, ground wire 5, negative collector reference supply $E_{r1}$, and resistor R. If there was no input D2 on transistor T4, the transistor would be cut off and the capacitor C2 could not discharge in this manner.

When the voltage across the capacitor C1 changes polarity from the previous positive value to the present negative value, it will apply a negative signal to the base 21 of the transistor T2, saturating the transistor T2 and changing the output of the transistor T2 from the negative value of the collector reference supply $E_{r1}$ to zero and this will cause the impedance drop from the emitter 23 to the collector 22 of transistor T2 to become extremely low. The time it takes for the voltage across the capacitor C1 to change polarity is a function of which of the digital inputs have been energized by the binary coded signals.

At time *t*2, shown in FIG. 2, the conditions are returned to normal by the application of a negative signal input to the base 11 of the transistor T1.

At the time *t*3, when the negative input to the base 11 is again removed, the inputs D1 and D2 are both energized. The new time constant for the circuit will be a function of the resistance R times the capacitance of the circuit as determined by the capacitors C1 plus C2. The value of the capacitances are added as they are in a parallel circuit arrangement.

It might be noted at this point that for binary coded digital input pulses, the capacitor C2 should be twice the value of capacitor C1 and any succeeding capacitor should be twice the value of the next preceding one previously used in this manner.

At time *t*4, the circuit is again returned to normal conditions. At time *t*5, when the negative input to the base 11 of the transistor T1 is removed, and there are no binary coded digital signal inputs to the transistors T3 and T4, the time constant of the circuit is effectively zero. Therefore, the voltage across the capacitors C1 and C2 goes negative almost immediately.

It will be recognized that the objects of the invention have been achieved by providing a circuit capable of reading out a coded digital input signal, as a timed output pulse. The digital input signals respectively applied at D1 and D2 are read out selectively by removing the negative input to the base 11 of transistor T1 to get a timed output pulse at the collector 22 of transistor T2.

One preferred embodiment of the invention has been illustrated and described in detail. It is to be particularly understood that the invention is not limited thereto or thereby, and is susceptible of various changes and modifications without departing from the teachings of the present invention.

We claim as our invention:

1. In an electrical signal translating device for converting a pulsed input signal having a plurality of digits into a timed output signal, the combination of a plurality of energy storage devices with a different one of said storage devices being provided for each digit of said input signal, first circuit means for supplying a first voltage of a first polarity to store energy in each of said storage devices, second circuit means for supplying a second voltage of a second and opposite polarity to remove said stored energy from each of said storage devices, switching means operative with each of said storage devices for controlling respectively the removal of said stored energy from each of said storage devices in response to the respective digits of said input signal, and output signal providing means operative with each of said storage devices for sensing the energy stored in said storage devices and for providing an output signal having a time duration in accordance with the energy storage condition of said storage devices.

2. In an electrical signal translating device for converting a coded pulsed input signal having a plurality of digits into a timed output signal, the combination of a plurality of capacitors whose values are coded according to said coded input signal, with a different one of said capacitors being provided for each digit of said coded input signal, first circuit means for supplying a first voltage of a first polarity to place a charge on each of said capacitors, second circuit means including an impedance member for supplying a second voltage of a second and opposite polarity to discharge said charge on each of said capacitors in accordance with the relationship between the value of each of said capacitors and said impedance member, switching means operative with each of said capacitors for controlling respectively the discharge of each of said coded capacitors in response to the respective digits of said coded input signal, and output signal providing means operative with each of said capacitors for sensing the charge on said capacitors and for providing an output signal having a time duration in accordance with the discharge condition of said capacitors.

3. In an electrical signal translating device for converting a pulsed input signal having a plurality of digits into a timed output signal, the combination of a plurality of capacitors with a different one of said capacitors being provided for each digit of said input signal, first circuit means for supplying a first voltage of a first polarity to place a charge on each of said capacitors, second circuit means including an impedance member for supplying a second voltage of a second and opposite polarity to discharge said charge on each of said capacitors in accordance with the relationship between the value of each of said capacitors and said impedance member, switching means operative with each of said capacitors for controlling respectively the discharge of each of said capacitors in response to the respective digits of said input signal, output signal providing means operative with each of said capacitors for sensing the charge on said capacitors and for providing an output signal having a time duration in accordance with the discharge of said capacitors.

4. In an electrical signal translating device for converting a pulsed input signal having a plurality of digits into a timed output signal, the combination of a plurality of capacitors with a different one of said capacitors being provided for each digit of said input signal, first circuit means for supplying a first voltage of a first polarity to place a charge on each of said capacitors, second circuit means for supplying a second voltage of a second and opposite polarity to discharge said charge on each of said capacitors, voltage supply switching means operative to connect and disconnect said first and second circuit means respectively relative to said capacitors and to reverse this circuit arrangement upon the application of a signal to said voltage supply switch means, digital switching means operative with each of said capacitors for controlling respectively the discharge of each of said capacitors in response to the respective digits of said input signal, output signal providing means operative with each of said capacitors for sensing the charge on said capacitors and for providing an output signal having a time duration in accordance with the discharge of said capacitors.

5. In an electrical signal translating device for converting a pulsed input signal having a plurality of digits into a timed output signal, the combination of a plurality of capacitors with a different one of said capacitors being provided for each digit of said input signal, first circuit means for supplying a first voltage of a first polarity to place a charge on each of said capacitors, second circuit means for supplying a second voltage of a second and opposite polarity to discharge said charge on each of said capacitors, switching means operative with each of said capacitors for controlling respectively the discharge of each of said capacitors in response to the respective digits of said input signal, and output signal providing means operative with each of said capacitors for sensing the charge on said capacitors and for providing an output signal having a time duration in accordance with the net discharge of said capacitors.

References Cited in the file of this patent

UNITED STATES PATENTS

| | | |
|---|---|---|
| 2,925,585 | Bruce | Feb. 16, 1960 |
| 2,962,604 | Brittain | Nov. 29, 1960 |
| 2,964,708 | Steele | Dec. 13, 1960 |
| 2,987,629 | Germain | June 6, 1961 |
| 3,001,100 | Schuh et al. | Sept. 19, 1961 |